Feb. 10, 1970   J. G. BUCHANAN   3,494,579
SEAM FOR WIRE FABRIC
Filed Feb. 2, 1967
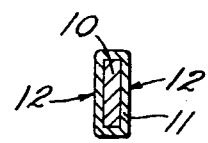
FIG. 1
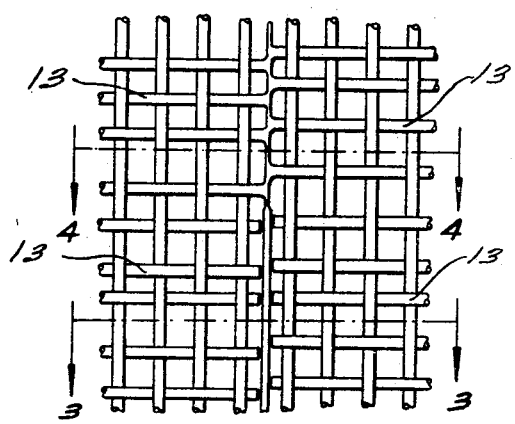
FIG. 2
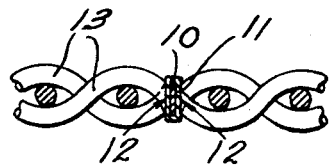
FIG. 3
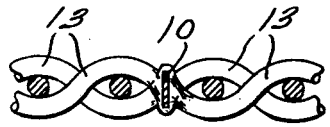
FIG. 4
INVENTOR
John G. BUCHANAN
ATTORNEY

United States Patent Office 3,494,579
Patented Feb. 10, 1970

3,494,579
SEAM FOR WIRE FABRIC
John Gordon Buchanan, Pointe Claire, Quebec, Canada, assignor to The Johnson Wire Works Limited, Montreal, Quebec, Canada
Filed Feb. 2, 1967, Ser. No. 613,541
Int. Cl. B21f 27/08; B32b 15/18
U.S. Cl. 245—10       8 Claims

ABSTRACT OF THE DISCLOSURE

A ribbon for forming a soldered junction between end edges of wire fabric, having an inner core and a surrounding sheath, the core being composed of refined gold or gold alloy and the sheath being composed of gold alloy of lower melting point, and a product having a seam joined by means of the ribbon.

---

The present invention relates to wire fabrics, more particularly woven wire belts for use on fourdrinier machines. More particularly, the invention concerns the joining or seaming of two ends of a woven wire fabric to form, for example, a continuous belt.

In the past, belts for fourdrinier machines have been conventionally made of bronze wire and such belts have had a limited length of service. More recently, stainless steel has been replacing bronze as the preferred material of the wire, resulting in screens or belts of longer service life, and this has imposed more stringent requirements upon the quality of the seam which joins the two ends of the wire fabric to form the belt.

The development of the present art of seaming fourdrinier wires, together with details of the conventional techniques, are illustrated in the following patents: Canadian Patent No. 284,878 (Franck, 1928), U.S. Patent No. 2,061,454 (Crossman, 1936), U.S. Patent No. 2,116,-811 (Webb, 1938), U.S. Patent No. 2,116,812 (Webb, 1938), and British Patent No. 463,760 (Tennant, 1937). In 1928 and 1929, following the use of sewn or stitched seams, the use of an inserted solder weft wire was employed. In 1936, the use of the modern ribbon seam became common. For the preparation of this type of seam, a core of non-fusible metal is surrounded by an outer sheath of fusible metal and rolled into a flat ribbon, which is placed between the prepared ends of the wire cloth. The ends of the wire cloth are butted up against the ribbon which stands vertically, and heat is supplied to melt the fusible shell and join the ends of the cloth together through the core, which remains solid at the temperatures used.

The conventional material used for the core is bronze, the sheath material being silver solder or a solder of gold alloy.

Although the conventional ribbon seam using a core of bronze is satisfactory for many applications, it has been found that when used on wires which are exposed to severe corrosive conditions, the core material is sometimes exposed by wear, and subsequently corrodes. This problem is aggravated where stainless steel wires are used, which have a longer period of life.

It has been proposed to use a seaming wire or ribbon of low-melting gold alloy, of such a size that the wire contains enough material to make a joint between opposite warp wires, but without leaving a core wire bridging the gap between the warp wires. This system has a practical disadvantage in that the warp wires must be perfectly aligned opposite each other along the full width of the fabric which may in some instances be as great as thirty feet. In practice, this disadvantage outweighs the advantage of having a non-corroding seam.

The present invention is directed to overcoming the disadvantages of the known systems above described. In accordance with the present invention, a cored ribbon is used, having a high melting inner core and a lower melting fusible outer sheath, but both the inner and outer material of the ribbon is made of non-corroding or noble metal.

More specifically, the invention is inclusive of the following aspects:

Firstly, a ribbon for forming a soldered junction between the end edges of wire fabric, comprising an inner core and a surrounding sheath, the core having a melting point sufficiently higher than the sheath to enable the sheath to be melted by soldering techniques without melting of the core, the core being composed of refined gold or gold alloy and the sheath being composed of gold alloy.

Secondly, a product inclusive of two end edges of wire fabric joined at a seam, the seam being formed of a continuous filament of gold or gold alloy soldered to the metal of the fabric by a gold alloy of lower melting point than the material of the filament.

The inner core may be of refined gold which has a melting point of 1945° F. or may be of a gold alloy, preferably of at least 18 kt. and of which the subsidiary alloying components are selected to maintain the melting point of the material as high as possible. It is well known in the goldsmith's art that the inclusion of certain subsidiary alloying materials such as palladium and rhodium will maintain the melting point high, whereas the inclusion of conventional softening materials such as silver and copper will reduce the melting point. A suitable material for use as the core material is 18kt. gold containing substantially 75% gold and about 17% paladium and 8% silver, by weight. This alloy has a melting point very slightly more than that of refined gold. The inclusion of palladium also increases the tensile strength of the alloy.

For the surrounding fusible sheath material, a gold alloy is used which may be from about 8 to 18 kt. and with subsidiary components selected to maintain the melting point substantially lower, for example, at least 100° F. and preferably about 400° F. less than the melting point of the material of the infusible core. The principal alloying materials for the fusible sheet are therefore preferably silver and copper, but small quantities of zinc and cadmium may be employed as in the solder described, for example, in Canadian Patent No. 484,348. A preferred material for the outer sheath is 18 kt. gold having a melting point of about 1260° F. and in which the alloying materials consist essentially of silver and copper.

In general terms, both the inner core and outer sheath are preferably of gold alloy and the core material should have a melting point preferably exceeding about 1650° F. and the fusible sheath material should have a melting point preferably below about 1450° F.

In order that the invention and its application may be better understood, an example is hereafter described in more detail covering the joining of two end edges of a fourdrinier belt, with reference to the accompanying drawings in which:

FIGURE 1 is an enlarged cross-section through a ribbon in accordance with the invention for use in joining the end edges of the belt;

FIGURE 2 is a view in plan of the edges of the belt in the process of being joined;

FIGURE 3 is an enlarged section along the line 3—3 of FIGURE 2; and

FIGURE 4 is an enlarged section along the line 4—4 of FIGURE 2.

In forming the seam of the invention, the conventional soldering steps as exemplified in the 1936 patent above for providing a ribbon seam may be adapted.

An example of the ribbon of the invention is shown in section in FIGURE 1 as having an inner core 10 and surrounding sheath 11. The ribbon is stood vertically and the ends of the wire cloth are butted up against the opposed major faces 12 of the ribbon, as shown in the lower part of FIGURE 2 and in FIGURE 3, and the ribbon is heated to melt the outer sheath. It will be seen from FIGURE 2 that the opposed weft ends 13 are not necessarily all aligned. Heat is supplied preferably from a gas-oxygen torch, the gas being, for example, natural gas containing mainly methane and generating a slightly reducing atmosphere and giving a torch temperature of the order of and preferably somewhat above 2000° F. The torch flame is applied in such a manner as to melt the sheath material to solder to the adjacent wires, leaving the core material intact as shown in the upper half of FIGURE 2 and in FIGURE 4. It will be apparent that the closer the melting point of the core and sheath materials the more difficult the operation of soldering will be. With a melting point difference of about 400–500°, the operation is relatively simple, but the operation may be formed with a melting point difference of as little as 100–200°.

The ribbon is preferably prepared by flattening a cored wire of a diameter of about .006 to about .010 inch to the desired width. The percentage of core material may generally range between about 30% and 10% of the cross-sectional area of the final ribbon shape. The cored wire from which the ribbon is produced may be made by making a cylindrical rod of the alloy material, boring the rod and filling it with the core material. The rod may be then drawn to the necessary small diameter, if necessary, with intermediate annealing steps as will be apparent to those familiar with the goldsmith's art. Alternatively, the initial rod, which may be of diameter small enough for reduction by a single wire-drawing operation, may be prepared by first preparing the inner rod of core material and centrifugally casting the lower melting sheath material around the inner rod, using, for example, a centrifugal dental mould. Other means of preparing the ribbon will be apparent to those familiar with the goldsmith's art.

It will be apparent that modifications may be made within the scope of the invention as defined by the following claims.

I claim:
1. A product comprising two end edges of wire fabric formed with stainless steel wires, a seam joining ends of said stainless steel wires, said seam formed by a continuous filament of gold or gold alloy extending transversely of said fabric, a sheath surrounding said filament, said sheath being formed of a gold alloy and having a lower melting point than said filament, said sheath embracing said ends of said stainless steel wires and connecting said ends to said filament to form said seam.

2. A product as claimed in claim 1 wherein the material of the filament and sheath respectively have a melting point difference of at least about 100° F.

3. A product as claimed in claim 1 wherein the material of the filament and sheath respectively have a melting point difference of at least about 400° F.

4. A product as claimed in claim 1 wherein the material of the filament has a melting point exceeding about 1650° F. and the material of the sheath has a melting point less than about 1450° F.

5. A product as claimed in claim 1 wherein the filament is composed of gold alloy of at least 18 kt. purity and said sheath is of gold alloy of purity at least approximately within the range of 8 to 18 kt.

6. A product as claimed in claim 5 wherein the filament alloy contains at least approximately, by weight, 75% gold, 17% silver and 8% copper, the alloy having a melting point slightly higher than that of refined gold.

7. A product as claimed in claim 6 wherein the sheath is composed of 18 kt. gold, the alloying materials consisting essentially of silver and copper, the material having a melting point of about 1260° F.

8. A product as claimed in claim 1 wherein the sheath is composed of 18 kt. gold, the alloying materials consisting essentially of silver and copper, the material having a melting point of about 1260° F.

References Cited
UNITED STATES PATENTS

| | | | |
|---|---|---|---|
| 3,186,663 | 1/1965 | Godschalx | 245—10 |
| 3,392,942 | 7/1968 | Stanton | 245—10 |
| 2,061,454 | 11/1936 | Crossman | 245—10 |

HYLAND BIZOT, Primary Examiner

U.S. Cl. X.R.
29—196, 199